US011722845B2

(12) United States Patent
Wang et al.

(10) Patent No.: US 11,722,845 B2
(45) Date of Patent: Aug. 8, 2023

(54) SYSTEM FOR COMBINING SENSOR DATA TO DETERMINE A RELATIVE POSITION

(71) Applicant: ADOBE INC., San Jose, CA (US)

(72) Inventors: Haoliang Wang, San Jose, CA (US); Stefano Petrangeli, Mountain View, CA (US); Viswanathan Swaminathan, Saratoga, CA (US); Na Wang, Fairfax, VA (US)

(73) Assignee: ADOBE INC., San Jose, CA (US)

( * ) Notice: Subject to any disclaimer, the term of this patent is extended or adjusted under 35 U.S.C. 154(b) by 175 days.

(21) Appl. No.: 17/176,982

(22) Filed: Feb. 16, 2021

(65) Prior Publication Data
US 2022/0264251 A1    Aug. 18, 2022

(51) Int. Cl.
*H04W 4/029* (2018.01)
*G06T 19/00* (2011.01)

(52) U.S. Cl.
CPC .......... *H04W 4/029* (2018.02); *G06T 19/006* (2013.01)

(58) Field of Classification Search
CPC .................................................. H04W 4/029
USPC ...................................................... 455/456.1
See application file for complete search history.

(56) References Cited

U.S. PATENT DOCUMENTS 8,990,006 B1* 3/2015 Wallace ............... G01C 22/006
701/408

2015/0350845 A1* 12/2015 Patel ..................... H04W 4/029
455/457
2019/0327124 A1* 10/2019 Lai .......................... G01S 5/017
2021/0058255 A1* 2/2021 Martins ................. H04L 9/3073

OTHER PUBLICATIONS

Zou, D., and Tan, P., "CoSLAM: Collaborative Visual SLAM in Dynamic Environments", IEEE Transactions On Pattern Analysis And Machine Intelligence, vol. 35, No. 2, pp. 354-366 (Feb. 2013).
Vasisht, D., et al., "Decimeter-Level Localization with a Single WiFi Access Point", In 13th USENIX Symposium on Networked Systems Design and Implementation, pp. 165-178 (2016).

(Continued)

*Primary Examiner* — Ted M Wang
(74) *Attorney, Agent, or Firm* — Shook, Hardy & Bacon LLP

(57) ABSTRACT

A first device determines relative position data representative of a position of one or more other user devices relative to the first device. To determine relative position data between the first device and a second device, the first device determines a distance between the first device and the second device at a plurality of timestamps. Additionally, the first device determines movement data at each timestamp from one or more device sensors. The movement data at each corresponding timestamp may reflect movement of the first device and/or the second device between a prior timestamp and the corresponding timestamp. The first device computes relative position data for the second device by combining the distance measurements and movement data over the plurality of timestamps, for instance, through a process of sensor fusion. By computing the relative position data, the first device may determine a transformation that can be used to convert between a coordinate system of the second device and the coordinate system of the first device.

19 Claims, 8 Drawing Sheets

(56) References Cited

OTHER PUBLICATIONS

Palumbo, F., et al., "A stigmergic approach to indoor localization using Bluetooth Low Energy beacons", In 12th IEEE International Conference on Advanced Video and Signal Based Surveillance, pp. 1-6 (2015).
Ran, X., et al., "ShareAR: Communication-Efficient Multi-User Mobile Augmented Reality", In Proceedings of the 18th ACM Workshop on Hot Topics in Networks, pp. 109-116 (2019).
Julier, S., J., and Uhlmann, J., K., "Unscented Filtering and Nonlinear Estimation", Proceedings of the IEEE, vol. 92, No. 3, pp. 401-422 (Mar. 2004).
"SwiftShot: Creating a Game for Augmented Reality", Oct. 29, 2020, Retrieved from Internet URL : http://web.archive.org/web/20201029174819/https://developer.apple.com/documentation/arkit/swiftshot_creating_a_game_for_augmented_reality, accessed on Mar. 2, 2023, p. 4.
Scherhäuf, M., et al., "UHF RFID Localization Based on Evaluation of Backscattered Tag Signals", IEEE Transactions on Instrumentation and Measurement, vol. 64, No. 11, pp. 2889-2899 (2015).
Gavin, H., P., "The Levenberg-Marquardt algorithm for nonlinear least squares curve-fitting problems", Department of Civil and Environmental Engineering, Duke University, pp. 1-19 (Nov. 27, 2022).

\* cited by examiner

SYSTEM FOR COMBINING SENSOR DATA TO DETERMINE A RELATIVE POSITION

BACKGROUND

Various applications benefit from the ability of a user device being able to track a relative location of another device. For example, users of augmented reality (AR) applications often wish to participate in a collaborative multi-user AR experience, with each user device sharing a synchronized view of virtual objects in a physical space. While each user device may be capable of independently mapping the physical space, the resultant mapping of the physical space (i.e., tracking map) cannot be guaranteed to be the same on each user device, especially when the user devices initiate an instance of an AR application at different locations in the physical space and/or different orientations. When each user device's tracking map is not the same, tracking virtual objects in the physical space will also differ, resulting in virtual objects being placed inconsistently in each user device's view of the physical space and/or virtual objects drifting as a multi-user AR session continues over time. For example, with differing tracking maps, when a user places a virtual vase on a table, the virtual vase may appear to float in midair on other user devices.

In traditional systems, each user device will seek to reach a consensus for tracking the physical space through a process called relocalization. In such systems, each user device exchanges its tracking map with other user device(s) and attempts to align its own tracking map with the tracking map(s) received from the other user device(s). By aligning the tracking maps, each user device is able to determine a transformation from another device's coordinates to its own coordinates to allow for virtual objects placed in the physical space by another user device to appear in the same physical location for each user device. However, tracking maps are often large in size and, as a result, sharing the tracking maps across multiple user devices causes significant communication delays, which increases as additional user devices join the multi-user AR session. Further, quickly aligning the tracking maps from multiple user devices requires significant computational resources, which may not be available in many user devices used for AR—such as smartphones, tablets, head mounted displays (HMD), and/or other mobile devices. Moreover, tracking maps are often unable to be successfully aligned using traditional systems. For example, where a perspective of a physical space is significantly different between users (e.g., portions of a physical space are captured in one tracking map, but are occluded in another tracking map), tracking maps of the different perspectives may not include enough similar data points necessary to reach an alignment consensus.

SUMMARY

Embodiments of the present disclosure relate to a system for combining sensor data to determine relative position data indicative of the position of one or more external devices relative to the position of a device. A relative position, as used herein, may refer to a relative location (e.g., XYZ coordinate location within a mapping of a physical space) and/or a relative orientation (e.g., three dimensional rotation about one or more fixed axes—such as one or more axes established at a center of a mobile device) of the user devices. Systems and methods are disclosed that compute a relative position of an external device based on combining distance data and movement data from a plurality of timestamps.

In some embodiments, a first device may determine relative position data representative of a position of one or more other user devices relative to the first device. To determine the relative position data between the first device and a second device, the first device may determine a distance between the first device and the second device at a plurality of timestamps. For example, distance measurements may be determined based on a time of flight (ToF) measurement of an ultra-wideband (UWB) signal. Additionally, the first device may determine movement data at each of the plurality of timestamps from one or more device sensors—such as accelerometers or gyroscopes as part of an inertial measurement unit (IMU), UWB sensors, and/or an antenna array for determining a signal's angle of arrival. The movement data at each corresponding timestamp may reflect movement of the first device and/or the second device between a prior timestamp and the corresponding timestamp. The first device may compute relative position data for the second device by combining the distance measurements and movement data (e.g., from the from the IMU and UWB sensors) over the plurality of timestamps, for instance, through a process of sensor fusion. By computing the relative position data, the first device may determine a 6 Degree of Freedom (6-DoF) transformation that can be used to convert between a coordinate system of the second device and the coordinate system of the first device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present systems and methods are described in detail below with reference to the attached drawing figures, wherein.

DETAILED DESCRIPTION

Figure 1:
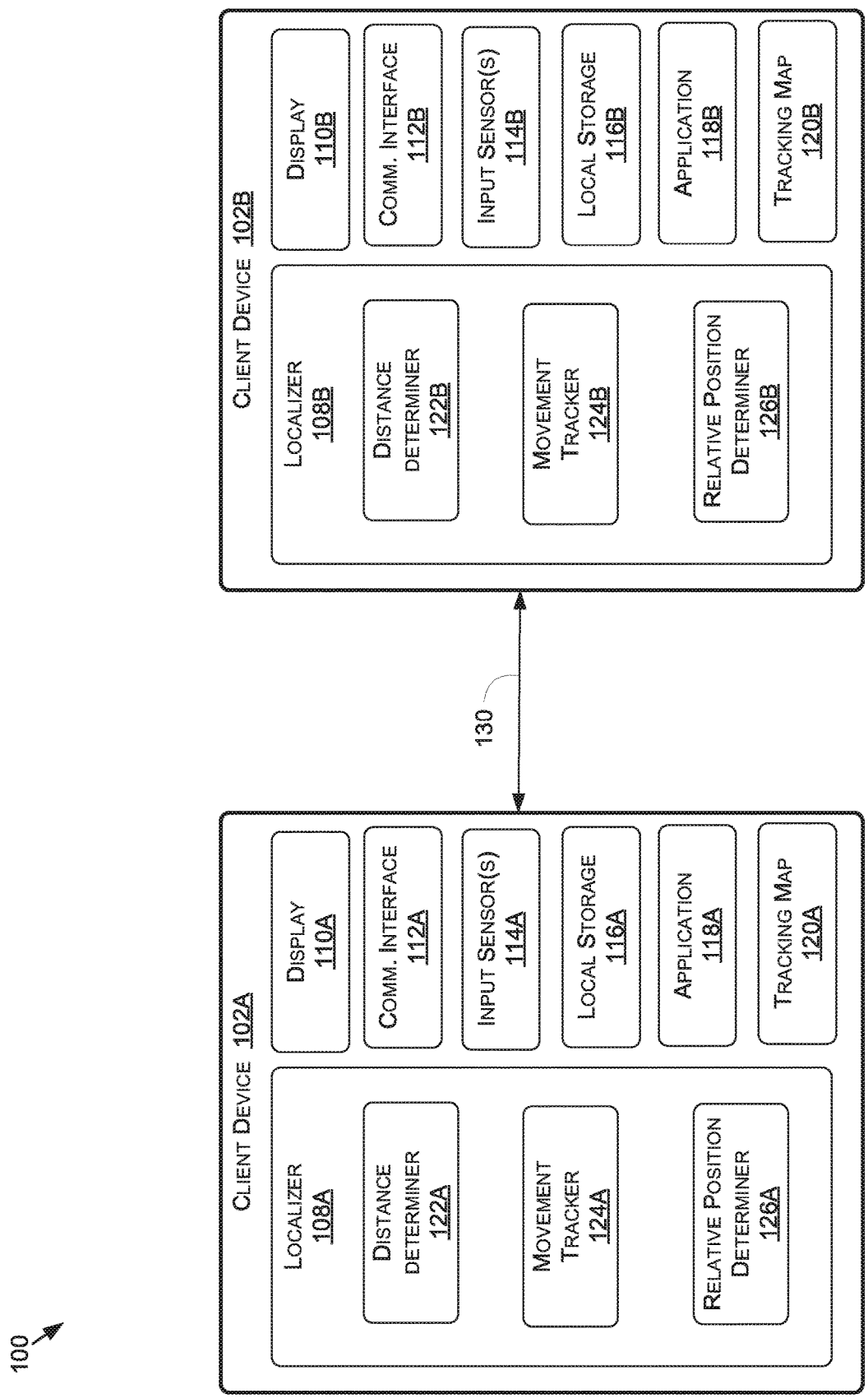
FIG. 1 is an example system diagram of a relative position determination system, in accordance with some embodiments of the present invention.

Various applications benefit from the ability of a user device being able to track a relative location of another device. For example, in a collaborative multi-user AR application, each user device must share a synchronized view of a physical space in order for interactions with the physical space to be synchronized across each user device. In such applications, while each user device may be capable of independently mapping the physical space, the resultant mapping of the physical space (i.e., tracking map) cannot be guaranteed to be the same on each user device, especially when each user device initiates an instance of the application at a different location in the physical space and/or different orientation.

In traditional systems, each user device will seek to reach a consensus for tracking the physical space through a process called relocalization. In such systems, each user device exchanges its tracking map with other user device(s) and attempts to align its own tracking map with the tracking map(s) received from the other user device(s). By aligning the tracking maps, each user device is able to determine a transformation from another device's coordinates to its own coordinates to allow for virtual objects placed in the physical space by another user device to appear in the same physical location for each user device. However, tracking maps are often large in size and, as a result, sharing the tracking maps across multiple user devices causes significant communication delays, which increases as additional user devices join an application session. Further, quickly aligning the tracking maps from multiple user devices requires significant computational resources, which may not be available in many user devices. Moreover, tracking maps are often unable to be successfully aligned using traditional systems. For example, where a perspective of a physical space is significantly different between users (e.g., portions of a physical space are captured in one tracking map, but are occluded in another tracking map), tracking maps of the different perspectives may not include enough similar data points necessary to reach an alignment consensus.

Accordingly, embodiments of the present invention are directed to streamlined and efficient systems and methods for combining sensor data to determine a relative position between user devices. In particular, a first device may compute a relative position for a second device by combining distance measurements and movement data over a plurality of timestamps, for instance, through a process of sensor fusion. A relative position, as used herein, may refer to a relative location (e.g., XYZ coordinate location within a mapping of a physical space) and/or a relative orientation (e.g., three dimensional rotation about one or more fixed axes—such as one or more axes established at a center of a mobile device) of the user devices. Although primarily described herein with respect to AR applications using one or more mobile devices, this is not intended to be limiting, and the systems and methods of the present disclosure may be implemented in any implementation for a device computing a relative position of an external device based on combining distance data and movement data from device sensors for a plurality of timestamps. For non-limiting examples, the systems and methods described herein may be implemented for simulation applications, virtual reality (VR) applications, gaming applications, home design, construction, education, engineering, and/or other relocation applications.

In some embodiments, multiple users may each initiate an instance of an application on separate user devices—such as on any combination of smartphones, tablets, head mounted displays (HMD), and/or other mobile devices—as part of a multi-user application session. Upon initiating each instance of the application, each user device may establish a coordinate system with a determined origin (e.g., XYZ=[0,0,0]) based on an initial location/orientation for each user device. Then, using image data collected by each device (e.g., via a camera, IR sensor, LIDAR, etc.), each device may generate a tracking map of a physical space that corresponds to the coordinate system for each device. For example, when a multi-user AR application session begins, each user device participating in the session may use a device camera to capture image data of a common physical space (e.g., living room, conference room, etc.) to generate a tracking map of the common physical space. Each user device may generate its own tracking map for use during the multi-user AR application session. The tracking map may comprise a point cloud that includes sets of feature points, which may correspond to a three-dimensional (3D) position of features in the physical space that a user device may track between frames.

Once the multi-user application session has begun, a first user device may determine a distance from the first user device to a one or more user devices. In some embodiments, the distance may be determined by measuring an amount of time for a signal to travel from the participant device to the user device (e.g., time of flight (ToF)). For example, the devices may each comprise transceivers capable of transmitting/receiving signals using a wide bandwidth (e.g., UWB—500 MHz or more) with a narrow signal pulse, which may result in sensor data with a very high resolution of timing and, consequently, distance (e.g., centimeter level distance measurements). Distance measurements (e.g., distance data) may be determined at regular time intervals. Each determined distance measurement may be associated with a corresponding timestamp. As a result, the user device may determine the distance to one or more participant device(s) at any given moment in time.

In further embodiments, once the multi-user application session has begun, each user device may determine its own movements and may transmit its movements to one or more other user devices. Movements may be determined based on processing movement data from one or more device sensors. For example, the user device may include inertial sensors—such as accelerometers or gyroscopes as part of an IMU—that enable detection of motion and/or orientation, relative to a corresponding initial coordinate system.

In some embodiments, movement data for each user device may be determined based on measuring the direction of an incoming signal from one or more other user devices participating in the multi-user application session. For example, each user device may include an array of two or more antennas that are configured to measure a difference in timing/phase of signals received by the two or more antennas. The array of antennas may generate a field-of-view (e.g., 130 degrees centered perpendicular to a front/back of the user device) for determining an angle of arrival for signals, such as UWB signals. For example, when another user device is within the field-of-view of the user device, the user device, using simple geometry, may accurately determine an angle of arrival for a UWB signal that is received from the other user device by calculating the difference between when the signal is received by the two or more antennas.

In any embodiment, measurement errors in sensor readings may be reduced using various techniques. Such techniques may include but are not limited to applying a filter (e.g., Kalman filter), sensor fusion, machine learning, statistical analysis, calibration, threshold based artifact rejection, and/or other methods of data normalization.

In a multi-user application session, a user device may compute a relative position of the one or more participating device(s) by combining the distance measurements corresponding to the one ore more participating device(s) at each timestamp with the determined movements of the user device at each timestamp. Combining the distance measurements with the determined movements may be completed through a process of sensor fusion. Sensor fusion may combine sensor data and/or data derived from disparate sources to generate information that is more certain/accurate than would otherwise be possible if each of the disparate sources were individually relied on. For example, initially at a first timestamp, the user device may only know the distance between the user device and another device because there may be no determined movement at the first timestamp. Knowing only the distance between the devices may be insufficient to determine the relative position of the other device because there are an infinite number of locations the other device may be located if relying solely on a distance measurement at a single timestamp (e.g., the other device might be below, above, in front, behind, left, right, etc. of the user device). However, by combining multiple distance measurements with multiple determined movements over time, the user device may exploit underlying geometric information from the multiple distance measurements and multiple determined movements to eliminate the number of potential locations for the other device in order to accurately predict the location of the other device, as illustrated in FIG. 2. Once the relative position has been determined for the one or more participant user devices, the tracking map may be updated to include the relative position of these device(s).

The relative location, as used herein, refers to the location of one or more user device(s) with regard to a first user device's own initial coordinate system. Similarly, the relative orientation refers to rotations along three axes (pitch, yaw, roll) with regards to the first user device's initial settings. By computing the relative position of the one or more user device(s), the first user device may determine a transformation (e.g., transformation matrix) from the one or more user device(s) to the first user device. The determined transformation may be used to convert virtual object placement information from a coordinate system of the one or more user device(s) to the coordinate system of the first user device. For example, in a multi-user AR session, a second user device may place a virtual vase on a table in a physical space. The second device may transmit location data corresponding to the placement of the virtual vase to the first user device using the second device's coordinate system. Upon receipt of the location data corresponding to the placement of the virtual vase, the first user device may transform the location data from the second user device's coordinate system to the first user device's coordinate system, thus allowing the virtual vase to appear in the same relative location in the physical space on each device. Advantageously, by determining the transformation for location data received from the one or more user device(s) using the relative location of the one or more user device(s), the need to align a first user device's tracking map with that of the one or more user device(s) may be eliminated.

In some embodiments, the relative position of the one or more user device(s) may be used to align tracking maps. As discussed herein, the relative location of the one or more user device(s) refers to the location of one or more user device(s) with regard to each user device's own initial coordinate system and, as such, relative to each user device's tracking map. To align the first user device's tracking map with the tracking map of the one or more user device(s), the one or more user device(s) may transmit their tracking map(s) as well as their position within their tracking map and/or relative to the origin of their tracking map. Based on the relative position of the other device(s), the tracking map(s) and the one or more user device(s) position within/relative to the origin of their tracking map, the first user device may quickly and accurately align its own tracking map with that of the one or more user device(s). Advantageously, by determining the relative position of the one or more user device(s), the first user device may reliably align the tracking maps with less computation compared to traditional systems, resulting in lower latency and improved scalability.

Moreover, in embodiments where the one or more user device(s) tracking map(s) include reference points not included in the first user device's tracking map, the first user device's tracking map may be augmented with the missing reference points to generate a more compete tracking map for the first user device. For example, a portion of the physical space may be occluded from the perspective of the first user device, but may be captured by the tracking map of the one or more user device(s). In such example, once the tracking maps have been aligned, the tracking map of the first user device may be updated to include reference points corresponding to the occluded portion of the physical space.

With reference now to the drawings, FIG. 1 is an example system diagram of a relative position determination system 100, in accordance with some embodiments of the present invention. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The relative position determination system 100 shown in FIG. 1 includes client devices 102A and 102B (referred to collectively herein as "client devices 102"). Although two client devices 102A and 102B are illustrated in FIG. 1, this is not intended to be limiting. In any example, there may be any number of client devices 102. Each client device 102 can comprise one or more computing devices, such as the computing device 700 of FIG. 7, described in more detail below.

The client devices 102 communicate with one another via a network connection 130. The network connection 130 may include, for instance, Ultra-Wideband (UWB), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a wide area network (WAN) (e.g., the Internet, a public switched telephone network (PSTN), etc.), a global navigation satellite system (GNSS) network (e.g., the Global Positioning System (GPS)), and/or another network type. In any example, each of the components of the relative position determination system 100 may communicate with one or more of the other components via network connection 130.

By way of example only and not limitation, each client device 102 comprises a smart phone, a laptop computer, a tablet computer, a wearable device, a game console, a virtual reality system (e.g., a headset, a computer, a game console, remote(s), controller(s), and/or other components), a streaming device, another type of device capable of supporting AR applications or other applications types (e.g., home design, construction, education, engineering, etc.), depending on the embodiment or implementation, and/or a combination thereof.

As shown in FIG. 1, the client devices 102A/102B include, respectively, a localizer 108A/108B, a display 110A/110B, a communication interface 112A/112B, an input sensor(s) 114A/114B, local storage 116A/116B, application 118A/118B, and tracking map 120A/120B. Although only a few components and/or features of the client devices 102 are illustrated in FIG. 1, this is not intended to be limiting. For example, the client devices 102 may include additional or alternative components, such as those described below with respect to the computing device 700 of FIG. 7.

The displays 110A and 110B (referred to collectively herein as "displays 110") comprise any type of display capable of displaying output, such as for instance, output from the application 118A/118B (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, each display 110 may include more than one display (e.g., a dual-monitor display for design application, a first display for configuring a design and an augmented reality display for viewing the design in a physical space, etc.). In some examples, a display 110 is a touch-screen display, such as a touch-screen of a smart phone, tablet computer, laptop computer, or the like, where the touch-screen is at least one of the input sensor(s) 114 of the client devices 102.

The communication interfaces 112A and 112B (referred to collectively herein as "communication interfaces 112") comprise one or more components and features for communicating across one or more networks, such as the network connection 130. The communication interfaces 112 may be configured to communicate via any number of network connection(s) 130, described herein. For example, the communication interfaces 112 may include a transceiver(s)—for UWB, Wi-Fi, ZigBee, Z-Wave, Bluetooth, BLE, etc.—for transmitting sensor data between client device 102A and client device 102B.

The input sensor(s) 114A and 114B (referred to collectively herein as "input sensor(s) 114") comprise any type of sensor capable of generating sensor data to provide inputs to the localizer 108A/108B and application 118A/118B. The input sensor(s) may include accelerometers or gyroscopes as part of an inertial measurement unit (IMU), an antenna array, signal processor, time-of-flight sensor, camera(s), keyboard, a mouse, a microphone(s), a touch-screen display, a controller(s), a remote(s), a headset (e.g., sensors of an AR headset), and/or other types of input sensors. Sensor data provided by the input sensors 114 may include, among other things, any data indicative of movement of a client device, distance to another client device, and/or relative position of another client device. For example, accelerometers, gyroscopes, and/or other components of an IMU may generate sensor data corresponding to movements (e.g., movement data) of the client devices 102. In other example, a time-of-flight sensor may generate sensor data corresponding to an amount of time taken for a signal to travel between client devices 102. In yet another example, an antenna array may generate sensor data corresponding to an angle of arrival for an UWB signal received at the client devices 102. In any example, some or all of the sensor data generated from different types of input sensors 114 may be combined through sensor fusion. Sensor fusion combines sensor data or data derived from disparate sources such that the resulting information has less uncertainty than would be possible when these sources were used individually. Sensor fusion may be achieved via systems and methods described herein and may be combined, wholly or in part, with a number of methods and/or algorithms including, but not limited to, a Kalman filter, Convolutional Neural Networks (CNN), Central limit theorem, Bayesian networks, Dempster-Shafer, and the like.

The local storage 116A and 116B (referred to collectively herein as "local storage 116") comprise any of a variety of computer-readable media. The computer-readable media may be any available media that can be accessed by the client devices 102. The computer-readable media may include both volatile and nonvolatile media, and removable and non-removable media. By way of example, and not limitation, the computer-readable media may comprise computer-storage media and communication media. The local storage 116 may include additional or alternative components, such as those described below with respect to the memory 712 of FIG. 7. In accordance with some embodiments of the present disclosure, portions of the localizer 108 may be stored in the local storage 116. In further embodiments, files of the application 118—such as a virtual object library—may be stored in the local storage 116.

The application 118A and 118B (referred to collectively herein as "application 118") is any application that utilizes relative position information between client devices 102 generated using at least some of the embodiments of the present disclosure. For example, the application 118 may be an application capable of operating on the client device 102 and may be configured for simulations, augmented reality (AR), virtual reality (VR), gaming, home design, construction, education, engineering, and/or other collaborative applications. In some embodiments, though not depicted in FIG. 1, the application 118 and/or patches or updates to the application 118 may be downloaded from a software distribution service or may be downloaded from another server, such as a content delivery network (CDN).

The tracking map 120A and 120B (referred to collectively herein as "tracking map 120") is generated using sensor data received from input sensors 114. The tracking map 120 may include a point cloud that includes a set of data points (e.g., feature points) in 3D space. The data points may represent a 3D shape, object, surface, profile, user device and/or other element located/predicted in a physical space. Each data point may correspond to a set of X, Y and Z coordinates. Further, each data point may be tracked by a user device—such as client device 102—between frames. In some embodiments, the tracking map 120 may include a point cloud that is directly rendered and referenced. Additionally or alternatively, the tracking map 120 may reconstruct the surfaces of a physical space by converting the point cloud to a polygon/triangular mesh model, a non-uniform rational basis spline (NURBS) surface model, and/or computer-aided design (CAD) model.

The localizer 108A and 108B (referred to collectively herein as "localizer 108") include distance determiner 122A and 122B (referred to collectively herein as "distance determiner 122"), movement tracker 124A and 124B (referred to collectively herein as "movement tracker 124"), and relative position determiner 126A and 126B (referred to collectively herein as "relative position determiner 126"). In general, the localizer 108 receives sensor data via the input sensor(s)

114. The received sensor data is processed by the distance determiner 122, the movement tracker 124, and/or the relative position determiner 126 to determine an understanding for how each of the client device(s) 102 are tracking a physical space (e.g., relocalization).

The distance determiner 122 determines a distance between two or more client devices 102 using sensor data from one or more input sensors 114. In some embodiments, the distance may be determined by measuring time of flight for a signal to travel from one client device 102 (e.g., the client device 102A) to another client device 102 (e.g., the client device 102B) over the network connection 130. For example, the client devices 102 may transmit/receive UWB signals using the network connection 130 via any combination of communication interface 112 and input sensor(s) 114. Distance measurements may be determined at regular time intervals. Each determined distance measurement may be associated with a corresponding timestamp and stored in local storage 116 in association with an instance/session of the application 118. As a result, a client device 102 (e.g., the client device 102A) may determine the distance to another client device 102 (e.g., the client device 102B) at any given moment in time.

The movement tracker 124 determines movements of the client device(s) 102. Movements may be determined based on processing movement data (e.g., sensor data) received from the input sensor(s) 114. For example, the movement tracker 124A may receive sensor data corresponding to movements (e.g., via as accelerometers or gyroscopes as part of an IMU) of the client device 102A. The sensor data may further be associated with one or more corresponding timestamps. Movements of the client device 102A may be measured relative to an origin of a coordinate system of the client device 102A—such as that used for the tracking map 120A—and/or a previously determined location within the coordinate system of the client device 102A. Likewise, each of the client devices 102 may perform the operations described above using their respective components. Accordingly, each client device 102 may determine its own movements relative to its own coordinate system.

In some embodiments, the client device 102 transmits movement data to each additional client device 102 participating in an instance of the application 118. For example, the client device 102B may measure its own movements—via movement tracker 124B—relative to an origin of the client device 102B. Movement data corresponding to the movements of the client device 102B—such as sensor data generated by an accelerometer of an IMU—may be transmitted from the client device 102B to the client device 102A via network connection 130. Using the received movement data, the relative position determiner 126A of the client device 102A may then compute the relative location of the client device 102B by combining the movement data received from the client device 102B with movement data of the client device 102A and distance data at a plurality of timestamps.

In some embodiments, movement data for the client device(s) 102 may be determined by the movement tracker 124 based on processing an angle of arrival for an incoming signal from another client device 102. For example, the input sensor(s) 114 may include an array of two or more antennas that are configured to measure a difference in timing/phase of signals received by the two or more antennas. The array of antennas may generate a field-of-view for the client device 120 for determining an angle of arrival for signals, such as UWB signals. For example, when the client device 102B is within the field-of-view of the client device 102A, the client device 102A may accurately determine an angle of arrival for a UWB signal that is received from the client device 102B.

Figure 2B:
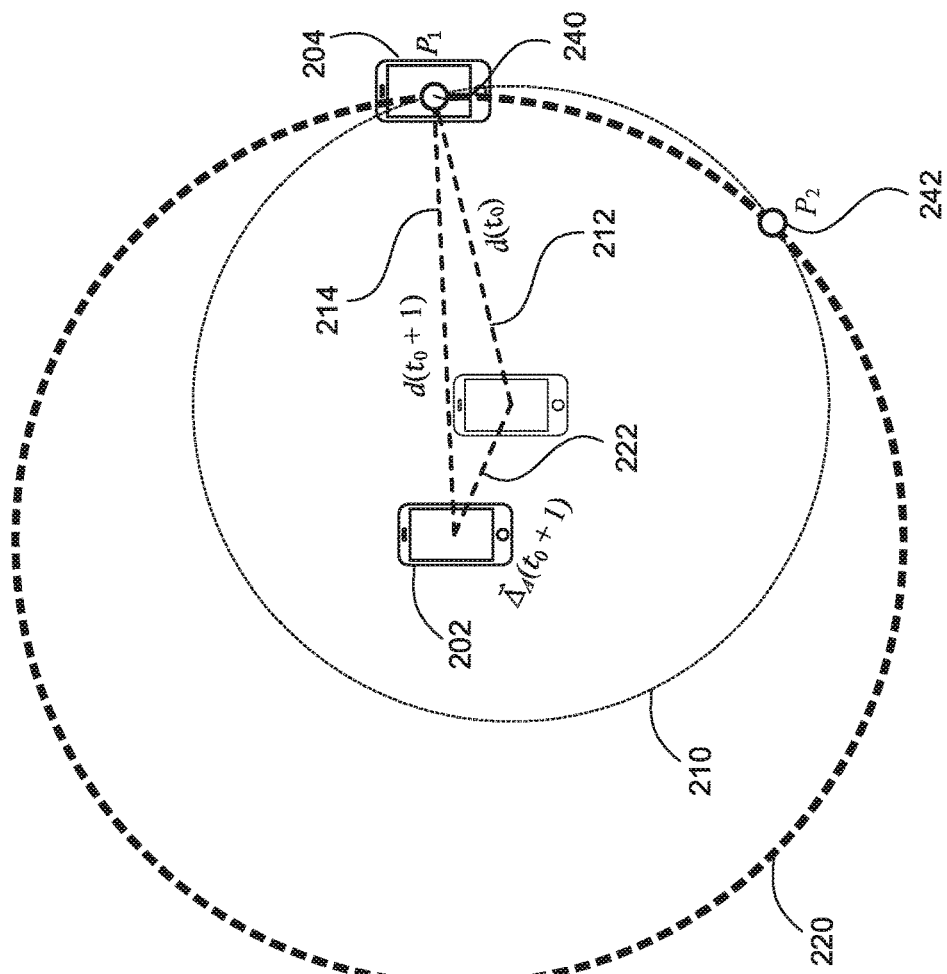
FIGS. 2A-2C illustrate an example of determining a relative location between two user devices, in accordance with some embodiments of the present invention.
Figure 2A:
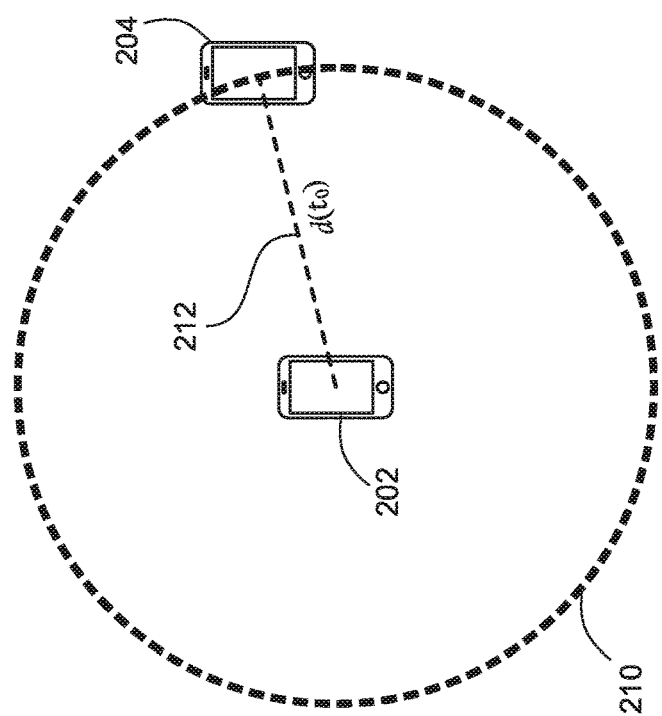
Figure 2C:
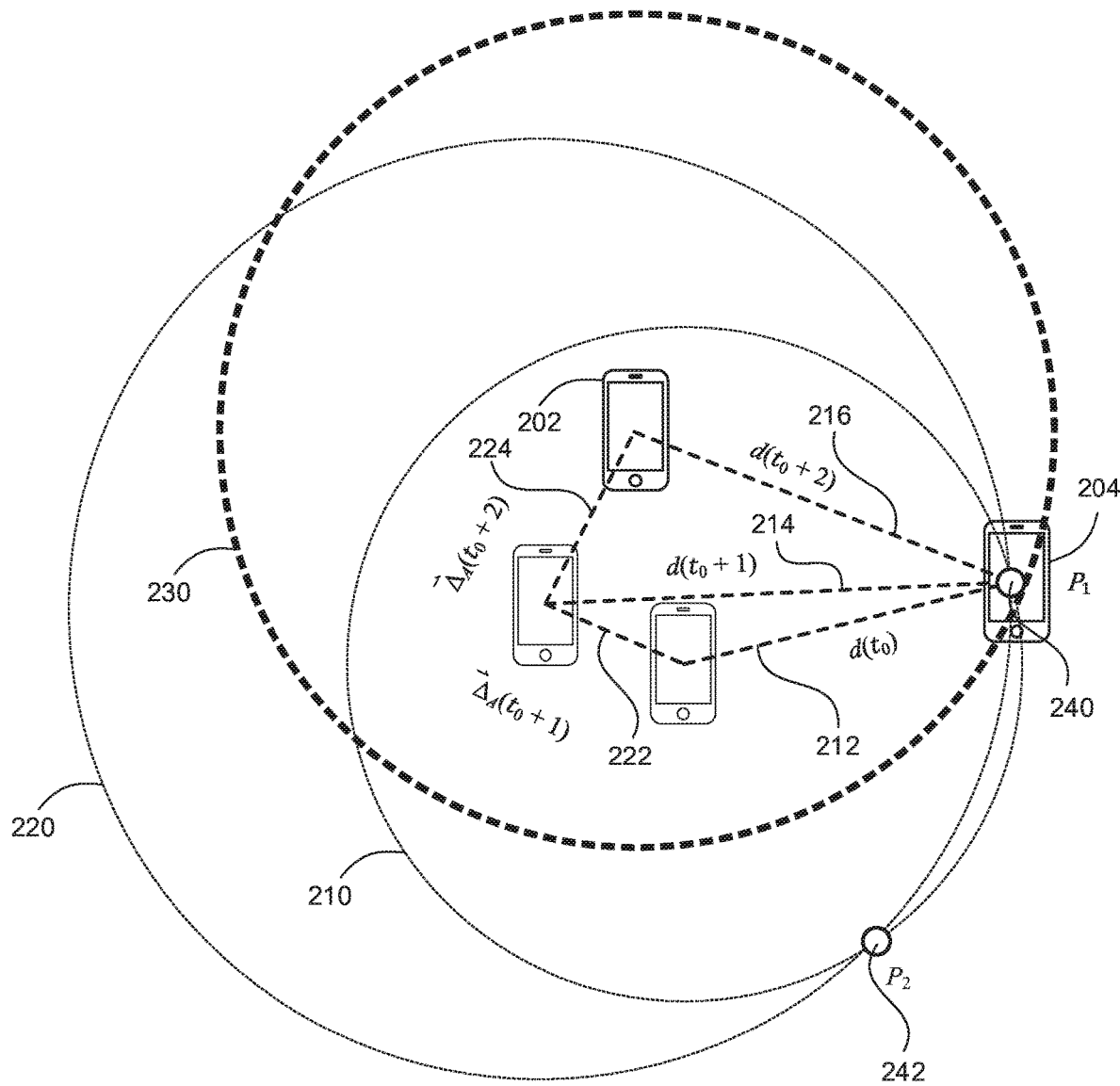

The relative position determiner 126 determines a relative position of one client device 102 to another client device 102. For example, the relative position determiner 126 may determine the relative location between client device 102A and 102B by combining and/or fusing distance measurements between client device 102A and client device 102B determined by the distance determiner 112A at each timestamp with movements of client device 102A and client device 102B, as determined by the movement tracker 124 at each timestamp. Based on an increasing number of distance measurements and an increasing number of determined movements over a period of time, the relative position determiner 126 may determine/predict a relative location of another client device 102 with the accuracy of the determination/prediction increasing with the increasing number of distance measurements and the increasing number of determined movements. For example, initially at a first timestamp, the relative position determiner 126A may only be provided with a single distance measurement between the client device 102A and the client device 102B, because there may be no determined movement at the first timestamp. With only the single distance measurement between the client device 102A and the client device 102B, the relative position determiner 126A may be unable to accurately determine the relative location of the client device 102B. For example, with only a single distance measurement there may be an infinite number of locations around client device 102A where client device 102B may be located. However, the relative distance determiner 126A may exploit underlying geometric information from the multiple distance measurements and multiple determined movements by combining/fusing multiple distance measurements with multiple determined movements over time. To accurately predict the location of the client device 102B, the relative position determiner 126A may eliminate the number of potential locations for the client device 102B by combining/fusing multiple distance measurements with multiple determined movements over time, as illustrated in FIGS. 2A-2C and further discussed below. In general, when the client device 102A and the client device 102B—or any number of client devices 102—are moving, the relative position determiner 126 may require additional distance measurements and movement data to determine the relative location for each client device 102.

A set of example equations to determine the relative location of a device are provided herein. The origin for a first device 'A' may be represented as $\vec{P}_A(0)$ with a second device 'B' represented initially as $\vec{P}_B(0)$ and being the device for which the system is determining the relative location. The system may use the following equation initially:

$$\vec{P}_A(0)=0$$

$$|\vec{P}_B(0)-\vec{P}_A(0)|=d(0)$$

Further, at each time step, the system may compute the following set of equations:

$$\vec{P}_A(t+1)=\vec{P}_A(t)+\vec{\Delta}_A(t+1)$$

$$\vec{P}_B(t+1)=\vec{P}_B(t)+\vec{\Delta}_B(t+1)$$

$$|R_{AB}|=|\vec{P}_B(t+1)-\vec{P}_A(t+1)|=d(t+1)$$

With enough observations over a plurality of time steps, the system may solve for the relative location of $\vec{P}_B(0)$. Moreover, with additional redundant observations, the system may reduce any measurement error to improve the accuracy of the relative location estimation. While the set of equations may be an overdetermined system of nonlinear equations with more equations than unknowns, a solution to the overdetermined system of equations may be interpreted in a least squares sense—such as the Gauss-Newton method or the Levenberg-Marquardt method.

In these equations, the direction of $\vec{\Delta}_A$ and $\vec{\Delta}_B$ are independent, which is to say that not only are the origins of the devices different from the perspective of A and B, the orientation/pose of the axes may be different as well. In some embodiments, relative position determiner 126 determines an orientation transformation of one client device 102 to another client device 102. For example, when client device 102A and client device 102B initiate an instance/session of the application 118, each of the client devices 102 may establish a base orientation with a corresponding coordinate system for each of the client devices 102. As the base orientation will often be different between the devices, the relative position determiner 126 may transform the orientation of the client devices 102 to the same coordinate system using direction measurements from the input sensor(s) 114 (e.g., UWB sensors, an array of antennas, etc.), as discussed further in relation to FIG. 3 below.

Based on the relative position determiner 126 computing the relative position of another client device 102, the localizer 108 may determine a transformation (e.g., transformation matrix) between coordinate systems of the two devices. For example, the localizer 108A may use the relative position of client device 102B—as determined by the relative position determiner 126A—to determine a transformation matrix for converting from the coordinate system of the client device 102B to the coordinate system of the client device 102A. Accordingly, the client device 102B may transmit location data corresponding to the placement of a virtual vase to the client device 102A via the network connection 130. The location data transmitted by the client device 102 may be based on the coordinate system of client device 102B. Upon receipt of the location data, the localizer 108A may use the transformation to transform the location data from the client device 102B coordinate system to the client device 102A coordinate system, thus allowing the virtual vase to appear in the same relative location in the physical space on the display 110A of client device 102A and the display 110B of client device 102B.

In some embodiments, the localizer 108 may use the determined relative position of the client devices 102 to align each respective tracking map 120. For example, the client device 102B may transmit the tracking map 120B to the client device 102A as well as a location of client device 102B within the tracking map 120B and/or relative to the origin of the tracking map 120B. Based on the relative position of the client device 102B, the tracking map 120B and the client device 102B location/orientation within/relative to the origin of their tracking map, the localizer 108A of client device 102A may quickly and accurately align the tracking map 120A with the tracking map 120B.

FIGS. 2A-2C illustrate determination of a relative location between a mobile device 202 and a mobile device 204. As shown in FIG. 2A, utilizing embodiments described herein, mobile device 202 determines a distance 212 between mobile device 202 and mobile device 204 at a first timestamp. At the first timestamp, the mobile device 202 and mobile device 204 may each be at a respective origin position. The mobile device 202 may determine the distance 212 at the first timestamp by calculating an amount of time (e.g., time-of-flight measurement) for a signal to be transmitted from the mobile device 204 to the mobile device 202. Based on the distance 212, a relative position determination system of the mobile device 202 may determine that the mobile device 204 is located somewhere on a circle 210. The circle 210 is drawn with mobile device 202 at the center with a radius of the distance 212. In embodiments, the mobile device 204 may be located anywhere on a sphere with mobile device 202 as the center and distance 212 as the radius; however, for illustration purposes, a 2D depiction of the scene is illustrated in FIGS. 2A-2C rather than a 3D depiction. This is not intended to be limiting.

FIG. 2B illustrates movement 222 of mobile device 202 from a first position at the first timestamp in FIG. 2A to a second position at a second timestamp. Further, a second distance 214 between mobile device 202 and mobile device 204 may be determined at the second timestamp. Based on the determined movement 222 and the second distance 214, the relative position determination system of the mobile device 202 may determine that the mobile device 204 is located somewhere on a circle 220. Then, based on determining the locations where circle 210 and circle 220 intersect, the relative position determination system of the mobile device 202 may determine that the mobile device 204 is located at one of position 340 or position 242.

FIG. 2C illustrates movement 224 of mobile device 202 from the second position at the second timestamp in FIG. 2B to a third position at a third timestamp. Further, a third distance 216 between mobile device 202 and mobile device 204 may be determined at the third timestamp. Based on the determined movement 224 and the third distance 216, the relative position determination system of the mobile device 202 may determine that the mobile device 204 is located somewhere on a circle 230. Then, based on determining the locations where circle 210, circle 220, and circle 230 intersect, the relative position determination system of the mobile device 202 may determine that the mobile device 204 is located at position 240. While FIGS. 2A-2C only depict movements of mobile device 202 with mobile device 204 remaining stationary, this is merely done for illustration purposes and is not intended to be limiting. In embodiments of the present disclosure, mobile device 202 and mobile device 204 may each move independently and the movements of the devices may be measured at each device.

In general, when both devices are moving, the relative position determination system may require additional measurements at additional timestamps compared to the number of measurements and timestamps depicted in FIGS. 2A-2C in order to determine the relative location of each device. For example, though not depicted in FIGS. 2A-2C, the mobile device 202 and the mobile device 204 may each move from their respective origin positions over a plurality of timestamps. At each timestamp, each of mobile device 202 and mobile device 204 may track their own respective movements and determine a distance between the mobile device 202 and mobile device 204. Additionally, the mobile device 202 and the mobile device 204 may exchange movement data corresponding to their respective movements by transmitting the movement data over a network connection, such as UWB. With enough distance measurements and movement data for the mobile device 202 and the mobile device 204, the relative position determination system of each mobile device 202/204 may determine the relative location of the other mobile device 202/204. Moreover, with additional redundant measurements and movement data, the relative position determination system of each mobile device may reduce any measurement errors and improve the accuracy of the determined relative location.

Figure 3:
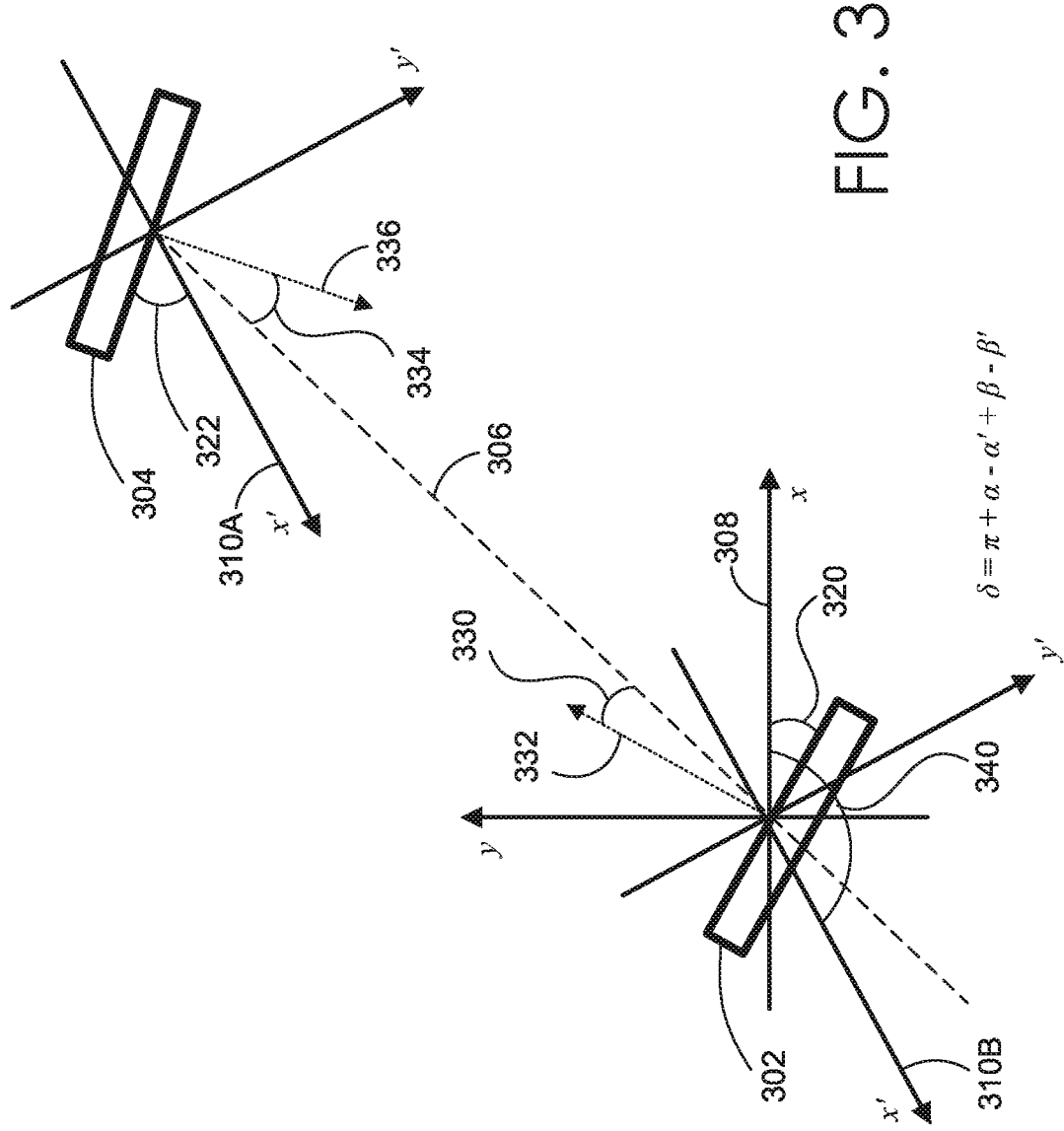
FIG. 3 illustrates an example of determining an orientation transformation between two user devices, in accordance with some embodiments of the present invention.

FIG. 3 illustrates determining an orientation transformation, in accordance with some embodiments of the present invention. FIG. 3 includes device 302, device 304, axis 308 and axis 310A/B. As illustrated, axis 308 represents the original orientation of the coordinate system corresponding to device 302. Axis 310A/B represent the original orientation of the coordinate system corresponding to device 304, where axis 310A is shown overlaid on device 304 and axis 310B is overlaid on device 302. However, it should be noted that axis 310A and axis 310B both represent the original orientation of the coordinate system corresponding to the device 304, but are displayed at different locations in FIG. 3 for illustration purposes. Angle measurement 320 represents a rotation angle of device 302 with respect to the axis 308. Angle measurement 322 represents a rotation angle of device 304 with respect to the axis 3010A/B. Angle measurement 330 represents a rotation angle of device 302 measuring the angle between a perpendicular projection 332 from device 302 and a direction measurement 306 (e.g., UWB direction measurement as may be determined using an angle of arrival measurement). Angle measurement 334 represents a rotation angle of device 304 measuring the angle between a perpendicular projection 336 from device 304 and a direction measurement 306. Based on the measurements above, the system may calculate a transformation 340 from device 304 to device 302. For example, equation $\delta = \pi + \alpha - \alpha' + \beta - \beta'$ may use the above measurements to determine the transformation from device 302 to device 304. In this equation, α corresponds to the angle measurement 334, α' corresponds to the angle measurement 330, β corresponds to the angle measurement 320, β' corresponds to the angle measurement 322, and δ corresponds to the transformation 340. With enough observations, the system may solve for the origin of device 304. With additional redundant observations, the system may gradually reduce measurement errors and improve the accuracy of estimations/predictions. While FIG. 3 illustrates determining an orientation transformation in 2D, this is merely for illustration purposes and is not intended to be limiting. The process may be replicated in 3D.

Figure 4:
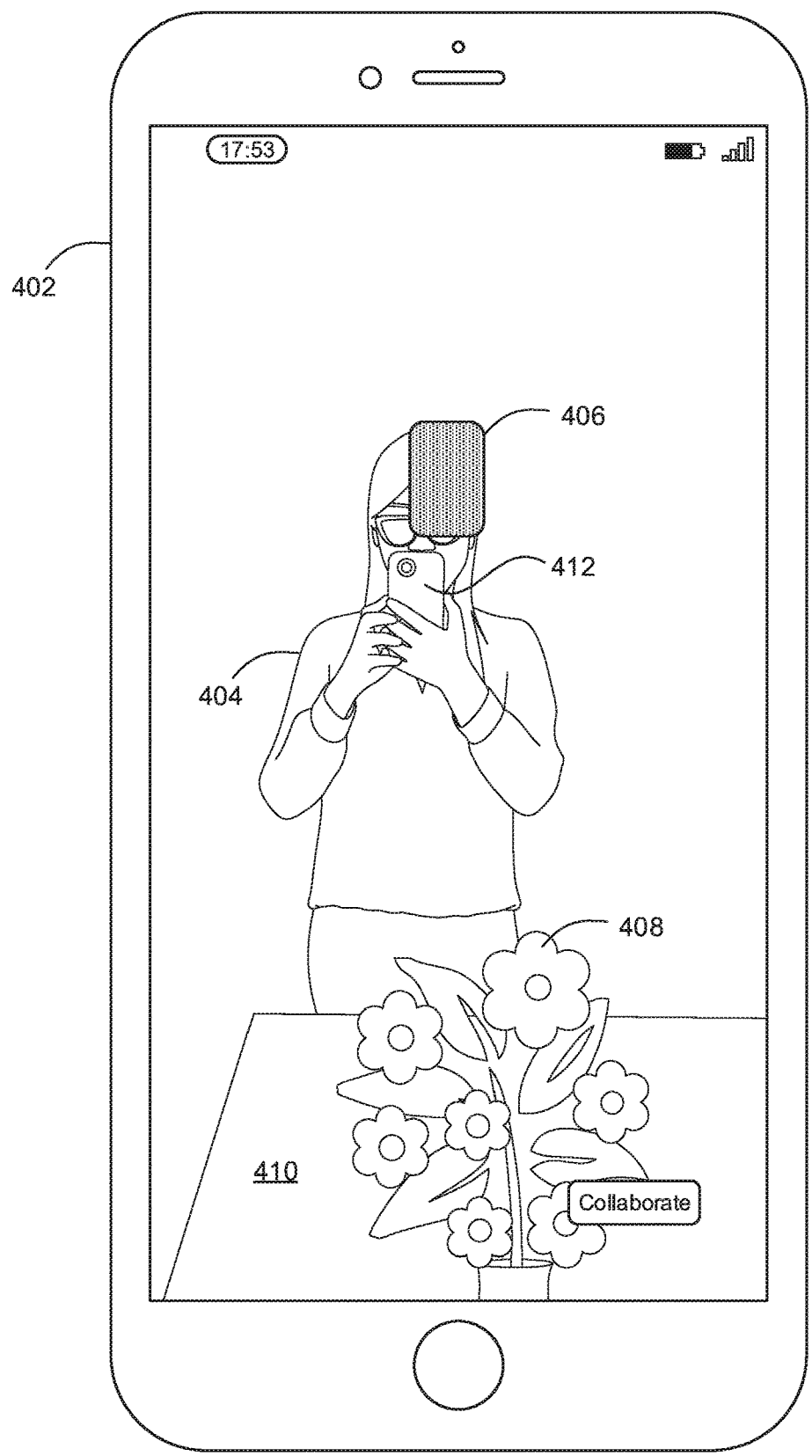
FIG. 4 is an example view from a multi-user AR application session, in accordance with some embodiments of the present invention.

FIG. 4 is an example view of a multi-user AR application session, in accordance with some embodiments of the present invention. FIG. 4 includes mobile device 402, user 404, predicted location indicator 406, virtual object 408, table 410, and mobile device 412. In operation, during a multi-user AR application session, a user holding mobile device 402 may view, via a display of the device, the table 410 with the virtual object 408 (e.g., vase with flowers) placed on the table 410. The user 404 may be holding mobile device 412 and may also view, via a display of the device, the table 410 with the virtual object 408 placed on the table 410. Utilizing embodiments described herein to determine the relative locations of mobile device 402 and mobile device 412, the virtual object 408 may appear at the same location on the table 410 when viewed via the displays of each mobile device 402 and 412. In some embodiments, the predicted location indicator 406 may indicate the predicted location of mobile device 412.

Figure 5:
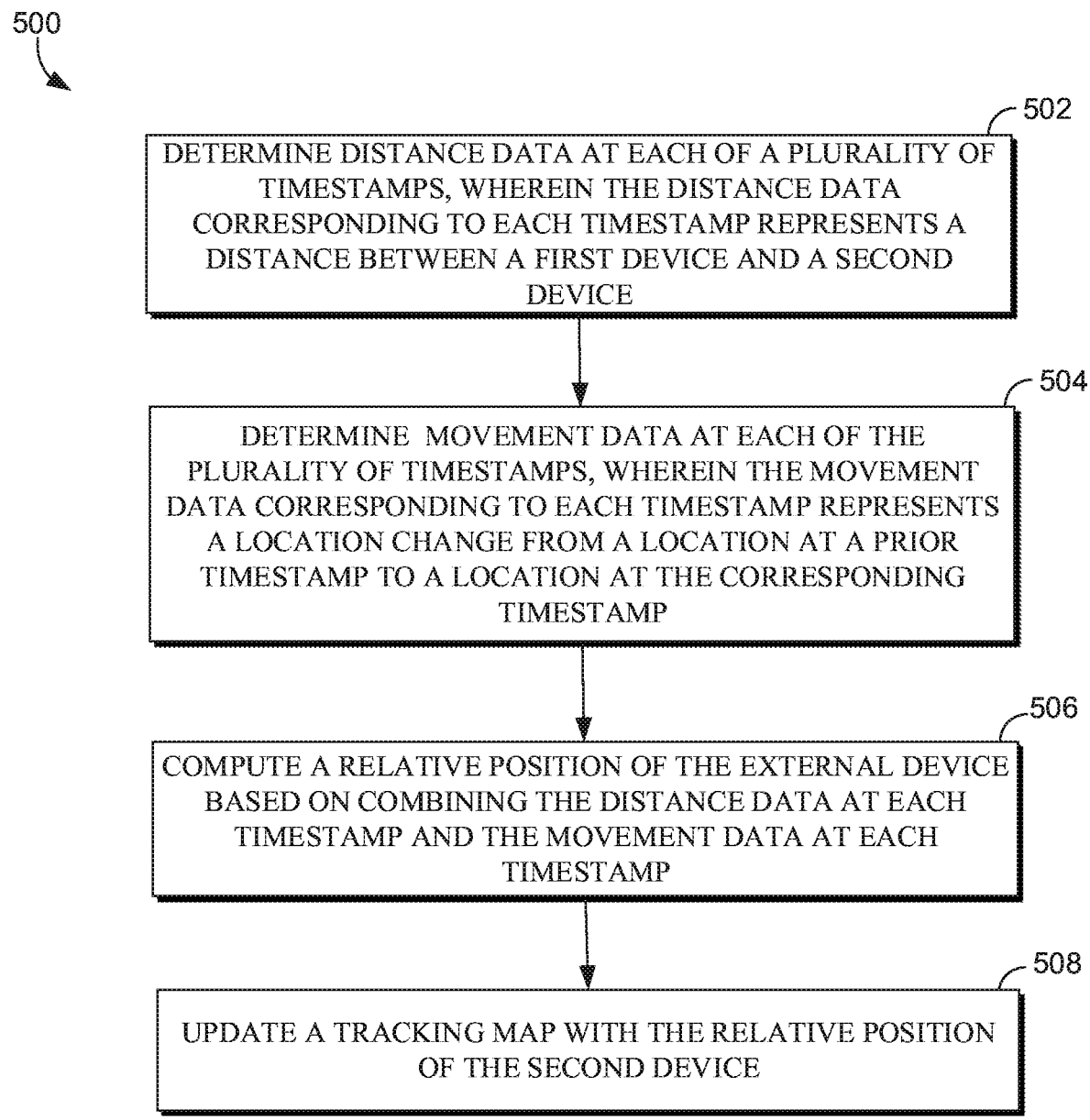
FIG. 5 is a flow diagram showing a method for determining a relative position, in accordance with an embodiment of the present invention.
Figure 6:
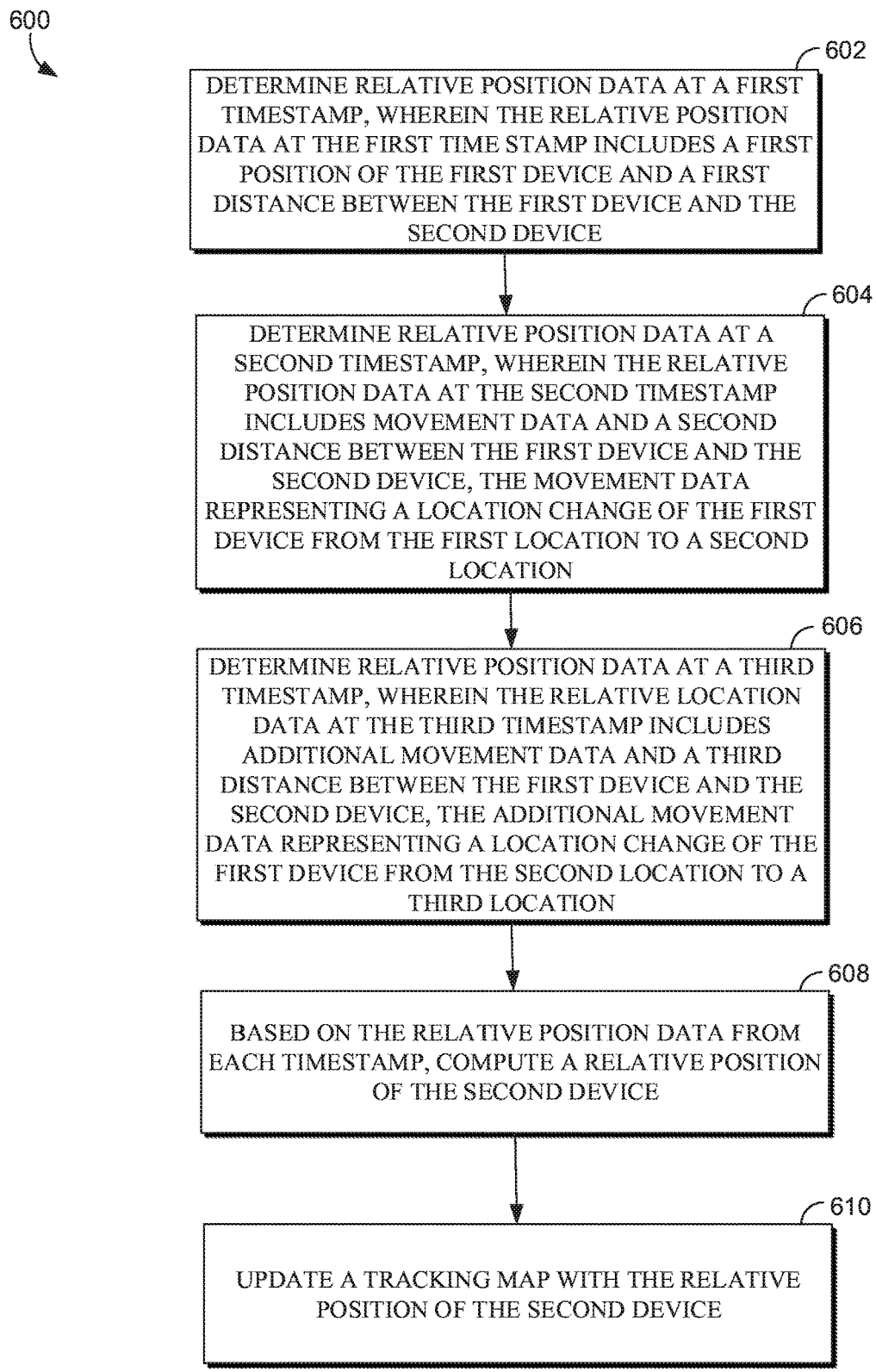
FIG. 6 is a flow diagram showing a method for determining a relative position, in accordance with another embodiment of the present invention.

Now referring to FIGS. 5-6, each block of methods 500 and 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The methods may be provided by a standalone application, a service or hosted service (standalone or in combination with another hosted service), or a plug-in to another product, to name a few. In addition, methods 500 and 600 are described, by way of example, with respect to the system of FIG. 1. However, this method may additionally or alternatively be executed by any one system, or any combination of systems, including, but not limited to, those described herein.

FIG. 5 is a flow diagram showing a method 500 for a first device to determine a relative position of a second device, in accordance with an embodiment of the present disclosure. The method 500, at block 502, includes determining distance data at each of a plurality of timestamps, wherein the distance data corresponding to each timestamp represents a distance between a first device to a second device. For example, in the context of a multi-user AR session, the first device may determine a distance from the first device to the second device at a plurality of timestamps during the multi-user AR session.

The method 500, at block 504, includes determining movement data at each of the plurality of timestamps, wherein the movement data corresponding to each timestamp represents a location change of the first device from a location at a prior timestamp to a location at the corresponding timestamp. For example, the first device may determine movements of the first device between timestamps based on processing movement data from one or more input sensors—such as accelerometers or gyroscopes as part of an inertial measurement unit (IMU) and/or an antenna array for determining a signal's angle of arrival. In some configurations, the first device also receives, from the second device, movement data corresponding to each timestamp that represents a location change of the second device for each timestamp. The movement data for the second device may be based on sensor data generated by one or more input sensors of the second device.

The method 500, at block 506, includes computing a relative position of the second device based on combining the distance data at each timestamp and the movement data at each timestamp. For example, in a multi-user AR session, the first device may compute a relative location of the second device by combining the distance measurements at each timestamp with the determined movements of the first device at each timestamp. Additionally or alternatively, the first device may compute a relative orientation of the second device (i.e., an orientation of the second device relative to an orientation of the first device). The relative position computed at block 506 may comprise a transformation that allows for converting between a coordinate system of the second device and a coordinate system of the first device.

The method 500, at block 508, includes updating a tracking map with the relative position of the second device. For example, once the relative position of the second device has been determined, the tracking map may be updated to include the relative position of the second device.

FIG. 6 is a flow diagram showing a method 600 for a first device to determine a relative position of a second device, in accordance with another embodiment of the present disclosure. The method 600, at block 602, includes determining relative position data at a first timestamp, wherein the relative position data at the first time stamp includes a first position of the first device, a first distance between the first device and the second device, and/or a first orientation of the first device.

The method 600, at block 604, includes determining relative position data at a second timestamp, wherein the relative position data at the second timestamp includes movement data and a second distance between the first device and the second device, the movement data representing a location change of the first device, including a location change from the first location to a second location and/or an orientation change. In some configurations, the first device may also receive movement data for the second device representing movement of the second device between the first timestamp and the second timestamp.

The method 600, at block 606, includes determining relative position data at a third timestamp, wherein the relative location data at the third timestamp includes additional movement data and a third distance between the first device and the second device, the additional movement data representing a location change of the first device, including a location change from the second location to a third location and/or an orientation change. In some configurations, the first device may also receive movement data for the second device representing movement of the second device between the second timestamp and the third timestamp.

The method 600, at block 608, includes computing a relative position of the second device based on the relative position data from each timestamp.

The method 600, at block 610, includes updating a tracking map for the first device with the relative position of the second device.

Figure 7:
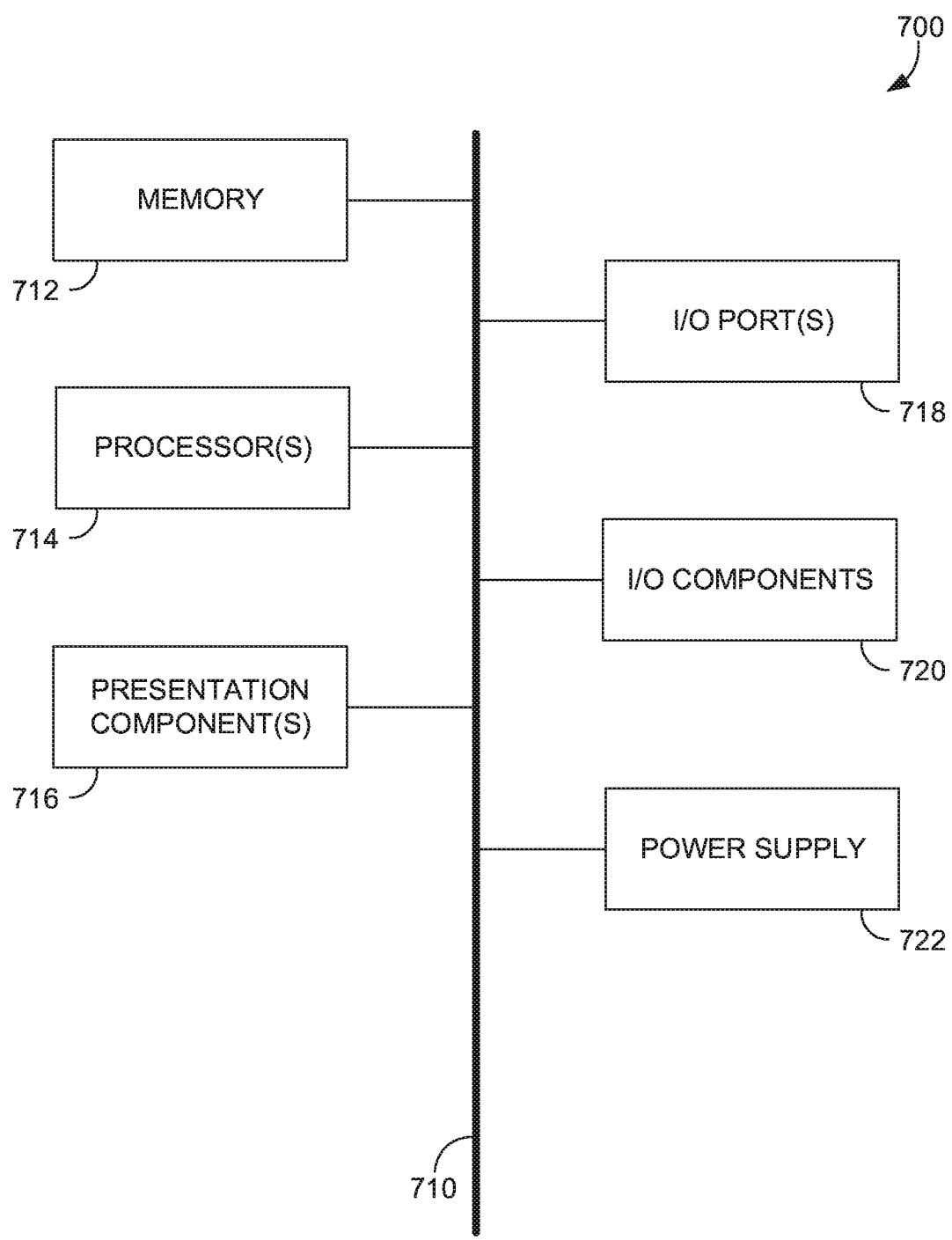
FIG. 7 is a block diagram of an example computing device suitable for use in implementing some embodiments of the present disclosure.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, non-transitory computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media is non-transitory as it does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low level software written in machine code can provide more complex functionality to higher levels of software. As used herein, computer-executable instructions include any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A method comprising:
   determining distance data at each of a plurality of timestamps, wherein the distance data corresponding to each timestamp represents a distance between a first device and a second device;
   determining movement data at each of the plurality of timestamps, wherein the movement data for each corresponding timestamp includes movement data for the first device representing movement of the first device between a prior timestamp and the corresponding timestamp;
   computing a relative position of the second device based on combining the distance data at each timestamp and the movement data at each timestamp; and
   updating a tracking map with the relative position of the second device.

2. The method of claim 1, wherein the movement data is determined based on combining sensor data from internal inertial movement sensors with a determined angle of arrival for a signal received from the external device.

3. The method of claim 1, further comprising aligning a second tracking map of the second device with the tracking map of the first device based on the relative position of the second device.

4. The method of claim 1, further comprising:
comparing a first coordinate system of the first device with a second coordinate system of the second device; and
computing a transformation from the second device based on the comparing and the relative position of the second device.

5. The method of claim 1, further comprising:
receiving location data corresponding to a placement location of a virtual object in a physical space from the second device;
transforming the location data from a second coordinate system of the second device; and
displaying, by the first device, the virtual object at the same placement location in the physical space.

6. The method of claim 1, wherein determining the distance data and the movement data is based, at least in part, on a received ultra-wideband signal.

7. The method of claim 1, wherein determining the movement data at each corresponding timestamp comprises receiving, from the second device, movement data for the second device representing movement of the second device between a prior timestamp and the corresponding timestamp.

8. A system comprising:
one or more processors;
one or more memory devices storing instructions thereon, that when executed by the one or more processors, cause the one or more processors to execute operations comprising:
determining relative position data at a first timestamp, wherein the relative position data at the first timestamp includes a first position of a first device and a first distance between the first device and a second device;
determining relative position data at a second timestamp, wherein the relative position data at the second timestamp includes movement data and a second distance between the first device and the second device, the movement data representing movement of the first device between the first timestamp and the second timestamp;
determining relative position data at a third timestamp, wherein the relative position data at the third timestamp includes additional movement data and a third distance between the first device and the second device, the additional movement data movement of the first device between the second timestamp and the third timestamp;
based on the relative position data from each timestamp, computing a relative position of the second device; and
updating a tracking map with the relative position of the second device.

9. The system of claim 8, wherein the movement data is determined based on combining sensor data from internal inertial movement sensors with a determined angle of arrival for a signal received from the external device.

10. The system of claim 8, the operations further comprising aligning a second tracking map of the second device with the tracking map of the first device based on the relative position of the second device.

11. The system of claim 8, the operations further comprising:
comparing a first coordinate system of the first device with a second coordinate system of the second device; and
computing a transformation from the second device based on the comparing and the relative position of the second device.

12. The system of claim 8, the operations further comprising:
receiving location data corresponding to a placement location of a virtual object in a physical space from the second device;
transforming the location data from a second coordinate system of the second device; and
displaying, by the first device, the virtual object at the same placement location in the physical space.

13. The system of claim 8, wherein determining the distance data and the movement data is based, at least in part, on a received ultra-wideband signal.

14. The system of claim 8, wherein the movement data at each timestamp comprises:
movement data for the first device representing movement of the first device between a prior timestamp and the corresponding timestamp; and
movement data for the second device representing movement of the second device between a prior timestamp and the corresponding timestamp.

15. One or more computer storage media storing computer-useable instructions that when used by a first device, causes the first device to perform operations comprising:
determining distance data at each of a plurality of timestamps, wherein the distance data corresponding to each timestamp represents a distance between a first device and a second device;
determining movement data at each of the plurality of timestamps, wherein the movement data for each corresponding timestamp includes movement data for the first device and the second device representing movement of the first device and the second device between a prior timestamp and the corresponding timestamp;
computing a relative position of the second device based on combining the distance data at each timestamp and the movement data at each timestamp; and
updating a tracking map with the relative position of the second device.

16. The one or more computer storage media of claim 15, wherein the movement data is determined based on combining sensor data from internal inertial movement sensors with a determined angle of arrival for a signal received from the second device.

17. The one or more computer storage media of claim 15, the operations further comprising aligning a second tracking map of the second device with the tracking map of the first device based on the relative position of the second device.

18. The one or more computer storage media of claim 15, the operations further comprising:
comparing a first coordinate system of the first device with a second coordinate system of the second device; and
computing a transformation from the second device based on the comparing and the relative position of the second device.

19. The one or more computer storage media of claim 15, the operations further comprising:
receiving location data corresponding to a placement location of a virtual object in a physical space from the second device;

transforming the location data from a second coordinate system of the second device; and
displaying, by the first device, the virtual object at the same placement location in the physical space.

* * * * *